United States Patent Office 2,808,235
Patented Oct. 1, 1957

2,808,235

HEAT TREATMENT OF FLOWABLE MASSES, MORE PARTICULARLY CHOCOLATE

Robert Sollich, Bad Salzuflen, Germany, assignor to Baker Perkins Limited, Peterborough, England Application June 30, 1953, Serial No. 373,996

Claims priority, application Germany August 25, 1952

14 Claims. (Cl. 257—4)

This invention relates to a process and apparatus for the heat treatment of flowable masses e. g. chocolate, to which the following description will be more particularly related.

The methods hitherto employed for bringing chocolate masses, such as are used in the confectionery industry, to certain desired temperatures are unsatisfactory in so far as they do not satisfy the necessary physical and economical requirements to an adequate extent. For example when a chocolate mass is cooled on a water-cooled surface, the surface becomes covered with a dense thickened layer which restricts the heat exchange and renders it necessary to remove this layer continuously. Unless the continuous removal of this layer is accomplished without setting up relatively large frictional forces, the conversion of these frictional forces into heat will cause a large proportion of the fat crystals in said mass to be reconverted into the liquid state whereby the desired intention is defeated. Further, in the case of chocolate which is to be put into a state suitable for pouring, it is essential that, apart from the mass having a definite temperature of about 32° C., a proportion of the cocoa fat crystals must have formed; if frictional heat is developed such of these heat-sensitive crystals as have already been formed, are again lost. It will, therefore, be appreciated that the development of frictional heat, such as occurs in the methods hitherto used, must be avoided for the process to be satisfactory commercially.

The development of frictional heat, as referred to above, occurs when the method or apparatus used have low efficiency. For example, when a liquid mass is conveyed through a cooling cylinder by means of a rotating worm, the efficiency is determined by the viscosity of the mass in that efficiency increases with the viscosity; however, increased viscosity involves higher molecular friction and consequently conversion of that friction into heat which besides involving wastefulness causes undesirable reactions in the material under treatment.

The object of the present invention is to provide a method and apparatus for continuously conveying a liquid mass, the temperature of which is to be adjusted, with the minimum of frictional resistance along the heat-exchanging surfaces responsible for said temperature adjustment.

The invention has for a further object the protection of any formed or forming crystals from being destroyed or retarded by any external or internal (inter-molecular) forces.

The invention still further has for an object the provision of apparatus whereby formed or forming crystals are moved towards the outlet end of the apparatus.

In order to obtain the above advantages the present invention eliminates any strong stirring motion in the heat exchanger part of the apparatus, and the force or energy input to the mass to cause it to traverse the heat exchanger is applied by pressure exerting means disposed externally to the heat exchanger space. Thus the forces developed and friction produced by this pressure exerting means has no detrimental effect on the mass under treatment as it takes place before the critical stage of heat exchange and conveyance of the mass through the heat exchanger part.

Figure 1:
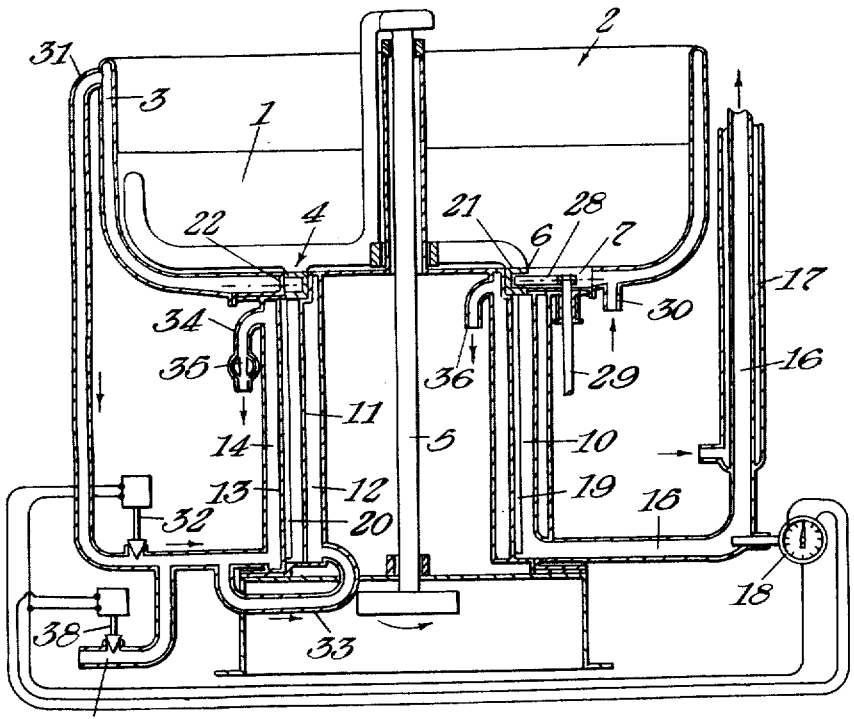
Figure 1 is a somewhat diagrammatic sectional side elevation of an embodiment of a device for the heat treatment of flowable masses such as chocolate, according to the present invention.

In carrying the invention into effect according to one mode, by way of example, the material 1 under treatment, for example chocolate mass, is maintained in a molten state in a container 2, the walls of which comprise the heated water jacket 3. A rotating stirring arm 4 driven by a central shaft 5 keeps the material in motion and further provides rotational drive for an annular pressure applying or pumping element 6 (hereinafter referred to as the pump 6), to be described hereafter, which is responsible for the continuous withdrawal of material through the bottom of the container 2 for subsequent temperature adjustment treatment. For this purpose the bottom of the container is former with an outlet 7 (see Figures 1 and 2) which communicates with the inlet 8 of the pump 6 (see Figure 2) which in turn has a continuously orbitally displaced outlet 9 through which material is pumped into an elongated annular heat exchange chamber 10 situated below and co-axially with the pump 6. The inner wall 11 of the heat exchange chamber 10 is provided with a water jacket 12 and the outer wall 13 with a water jacket 14, whereby the heat exchange taking place in the chamber 10 may be controlled as described hereafter. At the lower end of the heat exchange chamber 10 is connected the outlet or discharge passage 15 through which the heat treated material flows to a delivery pipe 16, which is also provided with a water jacket 17 for temperature maintenance or adjustment purposes. The temperature of the material flowing through the passage 15 is measured by a device 18 which is further equipped with temperature control means operative to control the heat in passing to the water jackets 12 and 14 as will be described hereafter.

In order to ensure the steady flow or sinking of the material through the annular space of the heat exchange chamber 10, and in order to prevent the formation of any static layer of the material on the walls 11 and 13 of the heat exchange chamber 10, scraper blades 19 and 20 are disposed in axially directed contact with the heat exchanger walls 11 and 13 respectively and depend from the underside of the pump 6 to be orbitally driven therewith. These blades are disposed on diametrically opposite sides of the pump 6 and are sufficiently thin with respect to their direction of forward movement, that any turbulence created in the continuously downwardly moving material is reduced to a minimum.

Figure 2:
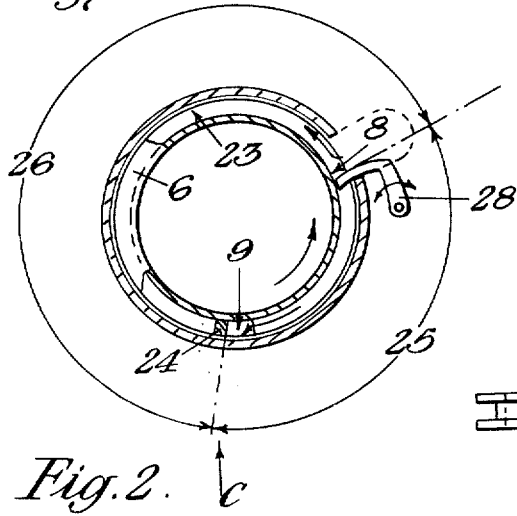
Figure 2 is a plan view of part of the device shown in Figure 1 and comprises the annular pump mechanism thereof.
Figure 3:
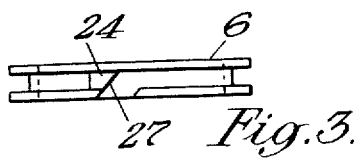
Figure 3 is a side elevation of the pump mechanism shown in Figure 2 viewed in the direction of the arrow C.

The pump 6 comprises an annular channel sectioned member 21 which, in co-operation with the wall 22 forming part of the water jacket 3 of the container 2, defines an annular pump chamber 23 with which the outlet 7 of the container 2 communicates through the pump inlet 8, as previously mentioned. Disposed radially across the pump chamber 23 is a vane 24 which in part divides the annular pump chamber 23 into a compression or pressure discharge portion and a suction portion (portions 25 and 26 respectively in Figure 2). In order to achieve the greatest expulsion of material from the pump at each complete rotation thereof, the pump outlet 9 is located immediately adjacent, but in advance of, the vane 24; furthermore, in order to assist discharge through the outlet 9 the edges thereof are bevelled (see Figure 3) and the advancing face 27 of the vane 24 is correspondingly inclined; this reduces the liability of solid particles, such as nuts in a chocolate mass, to cause jamming. To complete the pumping action of the pump 6 a displaceable but otherwise static vane 28 is located normally to extend through the pump inlet 8 and block the pump chamber 23 so as to form the second barrier between the compression section 25 and the suction section 26. As shown in Figure 2 material contained between the static vane 28 and the moving vane 24 is subjected to pressure when the pump rotates in the direction of the arrow and is forced out and down through the pump outlet 9. As the moving vane 24 approaches the displaceable static vane 28 the latter is pivoted out of position to allow the moving vane 24 to pass, whereupon the static vane is pivoted back into its pump chamber blocking position; the pivotal displacement movements of the static vane 28 are provided by means of a shaft 29 driven intermittently in timed relationship with the rotation of the pump 6 and therefore with the main shaft 5.

In order to regulate the pumping rate of the pump 6 without altering the speed of the drive shaft 5, provision may also be made for adjusting the amount by which the tip of the static vane 28 projects into the annular pump chamber 23; thus, when the static vane 28 completely blocks the chamber 23 (as shown in Figure 2), full pump displacement will be achieved; if, however, the vane 28 is partially withdrawn it serves only as a partial impedance and a proportion of the material can escape from the compression portion 25 of the pump, so lowering its rate of delivery.

Material is continuously drawn in through the pump inlet 8 and expelled through the pump outlet 9 so that the material is delivered into the heat exchange chamber 10 in an interrupted spiral as the pump outlet 9 progresses along its orbital path; at the same time the scraper blades 19 and 20 traverse the walls of the heat exchange chamber 10 and prevent deposition of the material thereon as previously described.

The water jacketing systems of the container 2 and heat exchanger chamber 10 are linked so that heated water delivered through inlet 30 to the container jacket 3 passes through that jacket and out through the outlet 31 thereof, which is connected through a valve 32 to the outer jacket 14 of the heat exchange chamber 10 and also via a by-pass 33 to the inner jacket 12. The outer jacket 14 has an outlet 34 in which is located a control valve 35, so that by adjustment of the valve 35 the rate of flow of hot water through the jackets 14 and 12 can be differentially varied, and therefore provide control of the heat exchange condition on the outer and inner walls 13 and 11 respectively of the heat exchange chamber 10; the inner jacket 12 having a water outlet 36. To give additional control to the water jacket temperatures a cold water inlet 37 is provided and communicates through a valve 38 with the feed to the heat exchanger jackets; the valves 32 and 38 are automatically controlled, preferably electrically, from the temperature detecting means 18 located in the heat exchanger outlet passage 15, whereby if the temperature of the outgoing mass is too high, valve 38 is opened to admit additional cold water and if the outgoing temperature is too low, the valve 32 is opened to increase the hot water flow. The water jacket 17 on the delivery pipe 16 is separately supplied with hot water which may be controlled as to temperature by independent means according to what further tempering treatment it is desired to give the material.

I claim:

1. Apparatus for the controlled treatment of flowable masses of material comprising a container for a bulk supply of said flowable mass having a container outlet, an annular heat exchange chamber having an inner and outer wall and a heat exchange chamber outlet, a rotatable ring member disposed between said container and said annular heat-exchange chamber and having a pump outlet communicating with said annular heat exchange chamber, said ring member and means on said container defining an annular pumping chamber concentric with said annular heat exchange chamber, said container outlet forming an inlet for said annular pumping chamber, a displaceable vane operating in said container outlet and adapted to move radially into said pumping chamber to divide the latter into a suction section and a pressure-discharge section, a moving pumping vane radially disposed in said pumping chamber and affixed to said ring member adjacent the rear of said pump outlet with respect to the direction of rotation of said ring member, and means for rotating said ring member relative to said container and said heat exchange chamber whereby said flowable mass is delivered from said container outlet in successive interrupted spirals with a minimum of friction through said annular heat exchange chamber.

2. Apparatus for the controlled treatment of flowable masses of material comprising a container for a bulk supply of said flowable mass having a container outlet, an annular heat exchanger having an inner and outer wall and a heat exchange chamber outlet, a rotatable ring member disposed between said container and said annular heat exchange chamber and having a pump outlet communicating with said annular heat exchange chamber, said ring member and means on said container defining an annular pumping chamber concentric with said annular heat exchange chamber, said container outlet forming an inlet for said annular pumping chamber, a radially displaceable vane operating in said container outlet so as to enter said pumping chamber and divide it into a suction section and a pressure discharge section, a moving pumping vane radially disposed in said pumping chamber and affixed to said ring member adjacent the rear of said pump outlet with respect to the direction of rotation of said ring member, said displaceable vane being arranged to cyclically pivot out of the path of said pumping vane and means for rotating said ring member relative to said container and said heat exchange chamber whereby said flowable mass is delivered from said container outlet in successive interrupted spirals with a minimum of friction through said annular heat exchange chamber.

3. Apparatus as claimed in claim 2 and further characterized in that the leading face of said pumping vane with respect to the plane of said outlet is cut obliquely to facilitate passage of said flowable mass through said pump outlet.

4. Apparatus as claimed in claim 2 and further characterized in that the said rotatable ring member has attached thereto fixed scraper blades disposed in said annular heat exchange chamber cooperative with one of said walls of said annular heat exchange chamber to prevent solidification of material thereon.

5. Apparatus as claimed in claim 2 and further characterized in that said container is provided with a centrally-mounted stirrer and the said rotatable ring member is connected to said stirrer.

6. Apparatus as claimed in claim 2 and further characterized in that said container is provided with a centrally-mounted stirrer, the said ring member is connected to said stirrer, and said displaceable vane is cyclically pivoted out of the path of said fixed pumping vane by means of a shaft driven intermittently in timed relation with said stirrer.

7. Apparatus as claimed in claim 2 and further characterized in that the amount of radial projection of said displaceable vane into said pumping chamber is adjustable to govern the rate of flow of said flowable mass being transferred from said container outlet through said pump outlet into said annular heat exchange chamber.

8. Apparatus for the treatment of a flowable mass of material which comprises a container for a bulk supply of such material, an annular heat exchange chamber communicating with said container and having an outlet jacket, an annular vane pump disposed between said container and said annular heat-exchange chamber, said pump having an orbitally travelling outlet through which said flowable material is delivered between the annular walls of said heat exchange chamber on a circular path congruent therewith, scraper blades operative in said annular heat exchange chamber upon movement of said annular vane pump, means for rotating said annular vane pump so as to cause said scraper blades to move said flowable material in said heat exchange chamber to prevent immobilization of said material therein, and means associated with said heat exchange chamber for maintaining a controllable cooling stage therein.

9. Apparatus as claimed in claim 8 further including temperature responsive means disposed near the terminus of said heat exchange chamber so as to contact the flowable material therein, and means responsive to said temperature responsive means for controlling the said cooling stage of said heat exchange chamber.

10. Apparatus for the treatment of flowable masses comprising a main container for a bulk supply of said flowable mass, means to control the temperature of the contents of said container, an annular heat exchange chamber having an inner and outer wall and a heat exchange chamber outlet, a rotatable ring member disposed between said container and said annular heat exchange chamber, said ring member and said container defining an annular pumping chamber concentric with said annular heat exchange chamber, said ring member having an outlet for said pumping chamber forming an inlet for said heat exchange chamber and said container having an outlet forming an inlet for said pumping chamber, means to rotate said ring member so that said pump outlet travels in an orbital path congruent with said annular heat exchange chamber so as to transfer said flowable mass from said container outlet with a minimum of friction through said annular heat exchange chamber, and means to control the temperature of said flowable mass passing through said heat exchange chamber.

11. Apparatus for the treatment of flowable masses comprising a main container for a bulk supply of said flowable mass, means to control the temperature of the contents of said container, an annular heat exchange chamber having an inner and outer wall and a heat exchange chamber outlet, an annular pump disposed between said container and said annular heat exchange chamber, said container having an outlet forming an inlet for said pump, said pump being concentric with said annular heat exchange chamber and having a pump outlet forming an inlet for said heat exchange chamber, means to rotate said pump so that said pump outlet travels in an orbital path congruent with said annular heat exchange chamber so as to transfer said flowable mass from said container outlet with a minimum of friction through said annular heat exchange chamber, and means to change the temperature of said flowable mass passing through said heat exchange chamber.

12. Apparatus for the treatment of flowable masses comprising a main container for a bulk supply of said flowable mass, means to control the temperature of the contents of said container, an annular heat exchange chamber having an inner and outer wall and a heat exchange chamber outlet, an annular pump disposed between said container and said annular heat exchange chamber, said container having an outlet forming an inlet for said pump, said pump being concentric with said annular heat exchange chamber and having a pump outlet forming an inlet for said heat exchange chamber, means to rotate said pump so that said pump outlet travels in an orbital path congruent with said annular heat exchange chamber so as to transfer said flowable mass from said container outlet with a minimum of friction through said annular heat exchange chamber, and means to flow heat transfer medium in external contact with one of said walls of said annular heat exchange chamber, temperature-responsive means disposed near said heat exchange chamber outlet, and means responsive to said temperature-responsive means to control the flow of said heat transfer medium to said one wall of said heat exchange chamber.

13. Apparatus for the treatment of flowable masses comprising a main container for a bulk supply of said flowable mass, means to control the temperature of the contents of said container, an annular heat exchange chamber disposed below said container having an inner and outer wall and a heat exchange chamber outlet, an annular pump disposed between said container and said annular heat exchange chamber, said container having an outlet forming an inlet for said pump, said pump being concentric with said annular heat exchange chamber and having a pump outlet forming an inlet for said heat exchange chamber, means to rotate said pump so that said pump outlet travels in an orbital path congruent with said annular heat exchange chamber so as to lay down successive interrupted spirals of said flowable mass into and around said annular heat exchange chamber whereby said flowable mass is transferred through said annular heat exchange chamber with a minimum of friction, and means to control the temperature of said flowable mass passing through said heat exchange chamber.

14. Apparatus as claimed in claim 13 wherein the annular pump has attached thereto elongated scraper blades of thin section disposed in said annular heat exchange chamber cooperative with said inner and outer walls of said annular heat exchange chamber to prevent immobilization of said flowable masses on said inner and outer walls.

References Cited in the file of this patent

UNITED STATES PATENTS

| | | |
|---|---|---|
| 1,280,851 | Rogers | Oct. 8, 1918 |
| 1,630,714 | Moir | May 31, 1927 |
| 1,671,666 | Bausman | May 29, 1928 |
| 1,763,086 | Bausman | June 10, 1930 |
| 1,806,206 | Lees | May 19, 1931 |
| 2,102,866 | Walter | Dec. 21, 1937 |
| 2,226,008 | Messinger | Dec. 24, 1940 |
| 2,610,036 | Heller | Sept. 9, 1952 |
| 2,724,339 | O'Connor et al. | Nov. 22, 1955 |

UNITED STATES PATENT OFFICE
CERTIFICATE OF CORRECTION

Patent No. 2,808,235                                        October 1, 1957

Robert Sollich

It is hereby certified that error appears in the printed specification of the above numbered patent requiring correction and that the said Letters Patent should read as corrected below.

Column 5, line 8, for "outlet" read --outer--.

Signed and sealed this 4th day of February 1958.

(SEAL)
Attest:
KARL H. AXLINE
Attesting Officer

ROBERT C. WATSON
Commissioner of Patents